United States Patent Office 3,570,142
Patented Mar. 16, 1971

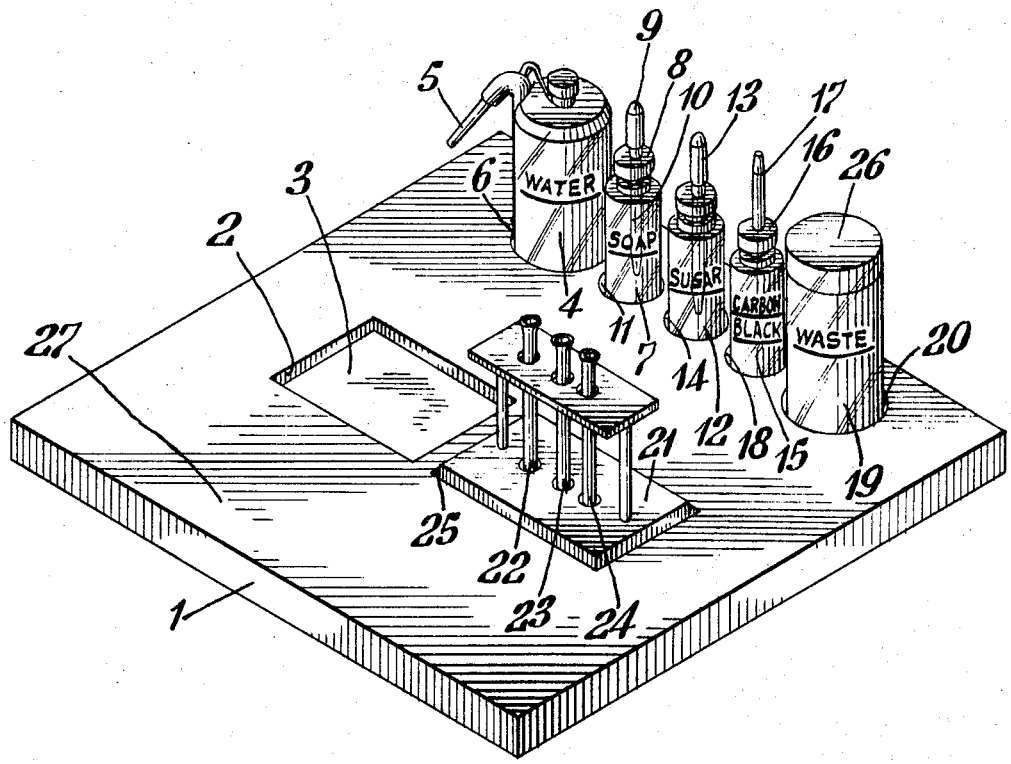

3,570,142
SCIENTIFIC EDUCATIONAL DEVICE FOR TEACHING WETTABILITY AND SUSPENDIBILITY
Jerry N. Koral, 34 Duke Drive,
Stamford, Conn. 06905
Filed Dec. 23, 1968, Ser. No. 786,044
Int. Cl. G09b 23/24
U.S. Cl. 35—18                                6 Claims

ABSTRACT OF THE DISCLOSURE

A scientific educational device for teaching, by means of an individual student experiment, the scientific concepts upon which the cleaning action of soap depends, namely the wettability of a surface by a liquid and the suspendibility of solid particles in a liquid. The preferred device consists of a baseboard containing containers for water, soap solution, non-surface active (e.g. sugar) solution and finely divided solid matter; a set of test tubes and sheets of non-wettable paper. The baseboard has recesses therein for locking each of the above component parts of the device into an ordered arrangement, thereby facilitating the teaching process and acting as a source of error control.

INTRODUCTION

This invention relates to an educational device which is suitable for demonstrating and teaching the two fundamental scientific concepts upon which the cleaning action of soap and detergents depend. These two concepts are concisely termed "wettability" and "suspendibility," and more completely as the wettability of a surface by a liquid, and the suspendibility of solid particles in a liquid. Both of these concepts are related to the scientific phenomena called "surface tension" which may be defined as the tendency of the surface of a liquid to contract to the smallest area possible (i.e. to assume a spherical form) due to the intermolecular attraction of the molecules of the liquid. The cleaning action of soap depends upon its ability to lower the surface tension of water. This, in turn, improves the ability of the water to wet the surface of solid matter, and then to keep the solid particles of matter suspended in the water. In other words, soap helps water to wet dirt upon an object (as well as the surface of the object itself) and then to keep the dirt suspended in the water so that once a dirt particle is removed from an object, it remains suspended in the water, rather than reattaching itself to the surface from which it was removed.

BACKGROUND

Though we live in a technologically dominated society, in which life is being changed at an ever increasing rate by scientific discoveries, science to the great majority of people remains a mystery. This lack of scientific knowledge—even among the supposedly educated—is due primarily to the gross neglect of scientific education, particularly at the elementary and high school levels. Increased scientific knowledge at all levels is therefore necessary if we are to provide our future social and intellectual leaders with a view of life which will enable them to better relate to their environment, and if we are to increase their capacity for understanding, creating and guiding the future.

The need for beginning the educational process as early as possible has become accepted by educators and phychologists ever since it has become recognized that only the upper limits of a person's intelligence are fixed by his heredity, and that the extent to which a person realizes his potential intelligence depends on his environment—especially during his early years of chlidhood.

In order to properly teach young children science, not only must the educational technique be pedagogically sound, but it must also be scientifically correct, and physically safe.

A sound pedago gical approach makes the learning process an extension and an enrichment of the child's natural curiosity. Thus, it must give him a free rein to explore, to test, and to become personally involved. A prime pedagogical requirement, therefore, is to gear the educational activity to an individual student rather than to a class; that is, have it involve a student-experiment rather than a teacher-demonstration. Individual activity, enabling newly acquired knowledge to be verified by personal experience, invariably leads to greater understanding.

Another attribute of sound pedagogical technique is to have minimum adult (i.e. teacher or parent) interference in the learning process. This can best be accomplished by providing the student with educational material which itself does the teaching, rather than the teacher. Such educational material must be designed to enable the student to work at his own pace, and should contain several levels of progressively greater intellectual challenge so that the student can match his intelligence to the proper level of challenge. Still another requirement for achieving minimum adult interference is to have the educational material self-correcting so that the student is able to determine for himself whether he has properly carried out the experiment. This eliminates the need for correction, praise, or other interference from the teacher, and fosters personal satisfaction as the reward for correct solution of a problem. Lastly, the educational material must be appealing to the child and contain an element of play so that the learning process becomes a pleasurable activity.

The requirement of scientific accuracy necessitates that the concepts to be taught, be geared to a child's level of understanding without, however, sacrificing truthfulness by oversimplification to the point of inaccuracy. Furthermore, the learning process should involve the "scientific method" as an integral part of the process; that is, it should be experimental and logical. The experiment should have a clear and simple relationship between the operational steps involved and the scientific concept it is intended to teach. Stress in such experiments should be placed on operations fundamental to the "scientific method," such as perceptual discrimination, measurement, trial and error experimentation, and logical deduction. Such a method will teach not simply a scientific fact, but also an awareness of the scientific approach. These objectives can best be achieved by providing children with self-contained units of appealing instructional material with which the child is able to involve himself in a process of inquiry, akin to the way science is actually done.

Teaching scientific concepts to young (i.e. preschool) children presents several special problems. One of these is the child's inability to read and therefore to follow written instructions. Where chemistry is involved, a pressing problem is one of safety, requiring that all experiments be performed with non-toxic or harmless materials. This requirement places severe limitations on experimental work, since the vast majority of chemical compounds are too toxic—at least if swallowed—to permit their being handled by young children. In addition, any device used must be capable of manipulation by children. Finally, the intellectual scope of the problem presented in an experimental environment must be capable of a child's solution. Thus, it is evident that to improve the content and process of scientific education necessitates the development of new educational materials satisfying all of the above requirements.

OBJECTS

It is an object of this invention to provide an educational device suitable for teaching the scientific concepts upon which the cleaning action of soap depends, namely wettability and suspendibility.

It is another object of this invention to provide an educational device suitable for teaching the concept of the wettability of a solid surface by a liquid.

It is another object of this invention to provide an educational device suitable for teaching the concept of the suspendability of solid particles in a liquid.

It is still another object of this invention to provide an educational device suitable for teaching children the concepts of wettability and/or suspendibility in a manner which is scientifically correct, pedagogically sound, and physically safe; which makes the "scientific method" an integral part of the learning process, and which is geared to personal involvement through an individual student activity.

It is yet another object of this invention to provide an educational device for teaching children the concepts of wettability and/or suspendibility which provides for having each component part locked into an ordered arrangement to facilitate the learning process and to act as a source of error control.

SUMMARY OF THE INVENTION

The above and other objects, which will become apparent from the present disclosure, are achieved by the present invention, which consists of an educational device suitable for teaching the scientific concepts of the wettability of a surface by a liquid and the suspendibility of solid particles in a liquid comprising, in combination: (1) a substrate having a surface substantially non-wettable by water, (2) a container suitable for containing water, (3) means for dispensing drops of water from said water container, (4) a container suitable for containing a soap solution, (5) means for dispensing drops of soap solution from said soap solution container, (6) a container suitable for containing finely divided, insoluble, solid particles of matter, (7) a plurality of transparent containers suitable for receiving said solid particles and liquid, (8) means for transferring said finely divided solid particles from their container to said plurality of transparent containers, and (9) a base having a space for each of said individual component parts (1) to (8), said spaces providing an ordered arrangement for said component parts thereby facilitating the teaching process and acting as a source of error control.

It will, of course, be obvious that the preferred embodiment described above may be modified so as to be suitable for teaching only the concept of wettability, or only the concept of suspendibility, without departing from the present invention. In order to provide a device suitable for teaching wettability alone, the embodiment described above may be modified simply by omitting the container of finely divided solid particles and the plurality of transparent cylindrical containers, as well as the spaces on the base therefor. On the other hand, in order to provide a device suitable for teaching suspendibility alone, the embodiment described above may be modified merely by omitting therefrom the substrate having the non-wettable surface and the space on the base therefor.

Thus, a second aspect of the present invention comprises an educational device suitable for teaching the scientific concept of the wettability of a surface by a liquid comprising, in combination: (1) a substrate having a surface substantially non-wettable by water, (2) a container suitable for containing water, (3) means for dispensing drops of water from said water container, (4) a container suitable for containing a soap solution, (5) means for dispensing drops of soap solution from said soap solution container, and (6) a base having a space for each of said individual component parts (1) to (5), said spaces providing an ordered arrangement for said component parts, thereby facilitating the teaching process and acting as a source of error control.

A third aspect of the present invention comprises an educational device suitable for teaching the scientific concept of the suspendibility of solid particles in a liquid comprising, in combination: (1) a container suitable for containing water, (2) means for dispensing drops of water from said water container, (3) a container suitable for containing a soap solution, (4) means for dispensing drops of soap solution from said soap solution container, (5) a container suitable for containing finely divided insoluble solid particles of matter, (6) a plurality of transparent containers suitable for receiving liquid and said solid particles, (7) means for transferring said finely divided solid particles from their container to said plurality of transparent containers, and (8) a base having a space for each of said individual component parts (1) to (7), said spaces providing an ordered arrangement for said component parts, thereby facilitating the teaching process and acting as a source of error control.

The term "soap" as used throughout the present specification and claims is intended to include not only all those materials which are technically soaps, but is intended also to include detergents, and surface active agents or surfactants. That is, the term "soap" is intended to include all soaps and soap like materials which lower the surface tension of water.

The means for dispensing drops of the various liquids may be entirely separate from the container of liquid (such as a dropper) the means may be integral with the container (such as a "squeeze bottle"), or the means may be removably attached to the container (such as a bottle with a screw top dropper).

THE DRAWING

A better understanding of the invention may be gained by reference to the accompanying drawing, in which the sole figure is a perspective view of a preferred embodiment of the present invention.

DETAILED DESCRIPTION OF THE INVENTION

Referring to the drawing, it can be seen that the device comprises a baseboard 1 having spaces or recesses therein for each of the various component parts of the device. Each of the spaces on the board may be marked (i.e. suitably labeled or coded as with a picture or symbol) to indicate which component part belongs therein. Space 2 contains a stack of paper sheets 3. At least one side of each sheet 3 has been silicone treated or otherwise coated to have a surface which is substantially non-wettable by water. Squeeze bottle 4 which is provided with nozzle 5, is made of flexible plastic, and is used for storing water. Drops of water are dispensed from bottle 4 through nozzle 5 by squeezing container 4. Space 6 is provided on base 1 for receiving bottle 4. Spaces 11 and 14 are intended for receiving dropper bottles 7 and 12 respectively. Bottle 7 is used for storing a soap solution, while bottle 12 is used for storing a solution having no surface active properties, such as for example, a sugar or salt solution. Bottle 7 is provided with screw top dropper 8 which has a rubber bulb 9 in communication with dropper nozzle 10. Bottle 12 is likewise provided with a screw top dropper 13. Bottle 15 is a flexible container for storing and dispensing finely divided solid particles such as carbon black. It is provided with a screw top dispenser 16. To dispense the solid, bottle 15 is inverted and squeezed, forcing the solid out through nozzle 17. Bottle 15 is stored in space 18. A waste jar 19 having a cap 26 is located in space 20. Test tubes 22, 23, and 24 are stored in test tube rack 21 which in turn is kept in space 25.

It is important to note that base 1 with its spaces or recesses functions not merely as a convenient storage board for the various component parts used in carrying out the experiment, but more importantly functions as an essential component part of the educational device by locking the working parts of the experiment into position and acting as a source of error control. Stress should be placed on keeping all the component parts in their designated spaces when not being used. This minimizes confusion and helps the child to concentrate on the parts he is using. Thus, the ordered arrangement of the parts is essential if young children, i.e. children of pre-school or early elementary age, are to be able to carry out the experiment substantially on their own, with only minimal adult supervision. As such, baseboard 1 with its spaces forms an essential component part of the invention.

USE OF THE DEVICE

For a child to gain the maximum educational benefit from the present invention, he should be taught its proper use. The following method may be used. First, the child should be introduced to the various parts of the device, their names and their functions. The child is then ready to be shown how to carry out the experiment.

It should first be explained to the child that soap increases the wettability of water by a phenomenon known as lowering its surface tension. Surface tension may be described as a force or inward pull on the surface of a drop of water which prevents it from spreading. The addition of soap decreases the tension on the surface of the drop of water and it collapses and spreads over the surface of the paper. This is somewhat analagous to having a balloon filled with water. If the balloon is kept intact, the water can't flow and has a definite shape. When the balloon is punctured, the tension of its surface is diminished causing the balloon to collapse and the water to spread over the surface. The addition of soap to water results in a similar puncturing of the surface tension resulting in collapse of a drop and its spreading over the surface.

To obtain an understanding of the concept of wettability, the child is instructed to place a piece of the specially treated paper 3 with the non-wettable surface facing up on the front working area 27 of board 1. Next the child should be told to place several drops of water from squeeze bottle 4 on the center of the paper sheet 3. The water will remain together in a pool. With one of his fingers, the child should be told to try and spread the water uniformly over the surface of the paper. He will observe that when his finger is removed from the paper, the water that was spread tends to return to its original drop-like shape, demonstrating the fact that water will not wet the paper surface.

The child is then instructed to add one drop of the soap solution from the soap bottle 7, using dropper 8, to the pool of water on the paper sheet 3 and again attempt to spread the water evenly over the surface of the paper sheet 3. This time he will observe that the water water will spread over the surface of the paper and remain in that position when his finger is removed. This has demonstrated through personal experience that soap will increase the "wettability" of water, i.e. that soapy water will more effectively wet a surface than will pure water.

Chemical compounds that are commonly used in soaps and detergents have similar chemical structure which enables them to increase the wetting power of water. Other types of common household chemicals will not increase the wetting power of water. The demonstration of this fact is an optional part of the experiment. It can be accomplished by using a sugar or salt solution in place of the soap solution. The child is instructed to place a new sheet of paper 3 on the working area 27 of board 1. Several drops of water from bottle 4 are placed on the paper sheet 3. A drop of sugar solution from bottle 12 is added, and an attempt is made to spread the water over the surface of the paper. The child will observe that the sugar solution has no effect on the wetting power of water, as did the soap solution. A similar observation would have been made if a solution of salt or baking soda, for example, were used in place of the sugar solution.

The child has at this point learned that while soap will cause a drop of water to spread over a non-wettable surface, a sugar solution will not.

With this learned knowledge, the child is now ready to carry out the determination of an unknown; that is, to perform a simple experiment in qualitative analysis, and at the same time to test himself. In order that reading ability be unnecessary the water, soap and sugar solution bottles 4, 7 and 12 may be marked on one side only or on the bottom with an appropriate and easily recognizable picture or symbol of its contents (rather than words as shown on the drawing) so that the child can identify the contents of these bottles. The bottles 7 and 12 containing the sugar and soap solutions should be turned so that the child cannot see the labels on the bottles and their relative positions should be changed so that he is not able to tell which is which. Several drops of water are now placed by the child on a new sheet of paper 3. Then a drop of one of the solutions from the bottles 7 or 12 is added to the water and the child told to try and spread the water. If it can be spread, he will know that the first bottle contained the soap solution. If the water did not spread, the first bottle contained the sugar solution. This can be verified by adding a drop from the second bottle to the water on the paper and observing the ease of spreading. The child can confirm his conclusions by examination of the labels on the bottles. Unlabeled bottles of solution may, of course, be used in place of the labeled bottles if testing rather than self-correction is desirable.

Once the soap has enabled the water to wet the soiled surface to be cleaned, the mechanical energy supplied by rubbing (as with one's hands or that caused by the agitation of a washing machine rotor) will loosen the dirt from a surface to be cleaned. After the dirt has been removed from the surface, it must be prevented from resettling on the hands or clothes being washed. Here soap performs its second important function; namely, to suspend the dirt particles in the water. In other words, the dirt particles must be "held" suspended in the water so that they can be rinsed away. Soap also has the ability to suspend dirt particles in water.

The concept of suspendability can be taught using the present invention in the following manner. Carbon black is used as a convenient source of "dirt." Bottle 15 which is filled with finely divided carbon black is inverted and the nozzle 17 placed inside the top of one of the test tubes 22. A slight squeezing of the plastic bottle 15 will force a small amount of carbon black into test tube 22. About a quarter inch of carbon black is adequate, the exact amount is not critical. The test tube is then filled to within about one half inch of the top with water using the plastic water dispensing bottle 4. Placing a finger or cork (not shown) over the top of the test tube 22, the tube is shaken several times to cause the particles of carbon black to become dispersed in the water. The test tube 22 is now placed back in the test tube rack 21 and the child will notice that the water has a deep black color. After about two minutes, he will observe that the black color is disappearing because most of the carbon black particles have started to settle to the bottom of the tube. The effect can be more readily seen if the tube is held in front of a light source, i.e. window or lamp. This experiment indicates that dirt will not remain suspended or dispersed in plain water.

The child is then instructed to fill a second test tube 23 with approximately the same amount of carbon black and water as before. He then adds several drops of soap solution from bottle 7 using the dropper 8. Test tube 23 is then covered by a finger or cork, shaken several times and placed back in the rack 21 to stand for several minutes. The child will observe that most of the dirt does not settle to the bottom of the test tube but remains suspended in the water. If the two test tubes are allowed to stand for a few more minutes, the test tube 22 with plain water will have a layer of almost clear water above the carbon black sediment, while test tube 23 containing soap will maintain a deep black color, demonstrating the ability of soap to keep dirt suspended in water.

As an optional part of the experiment, it can be demonstrated that other types of common household chemicals can not suspend dirt in water. To demonstrate this, the sugar solution will be used in place of the soap solution. A third test tube 24 should now be filled with carbon black and water as before. Five drops of sugar solution from bottle 12 are then added to the tube 24; it is covered or corked, shaken, and allowed to stand in the rack for several minutes. The child will observe that the black color is disappearing as with plain water because the sugar cannot suspend dirt in water.

The child can now be taught to utilize the knowledge gained from this experiment to solve a second problem of unknown identification. The sugar and soap solution bottles 7 and 12 are turned and their positions changed so the labels are hidden from view. The materials in test tubes from the previous part of the experiment can be emptied into waste jar 19. The test tubes should then be rinsed several times with water to be certain they are clean. Carbon black and water are now placed into clean test tubes 22 and 23 as before. Five drops of one of the solutions is added to one of the test tubes (preferably the one located in front of the bottle) and five drops of the other unknown solution is added to the other test tube (likewise, the one located in front of it). The alignment of the positions helps the child to remember which bottle was used to fill which test tube. Here again the spaces on the board help to lock the parts into an ordered arrangement which facilitates learning and helps prevent error. The test tubes are covered with a finger or corked, shaken and allowed to stand for about two minutes. The child should be readily able to identify the contents of the unknown solutions by the presence or absence of a suspension in the test tubes. His conclusions can be confirmed by examination of the label or coding on the bottles. The child has again learned that a specific property of a chemical compound (here suspendibility) can be used to dintinguish it from another compound.

The present invention besides teaching the child the scientific concepts of wettability nad suspendibility, also helps to develop the child's capacity for thinking logically through his personal involvement in a child-level scientific investigation. It introduces the child to the "scientific method" by making him verify his assumptions (regarding the ability of a solution to cause water to wet a surface or to suspend solids) by his own personal experience. It also helps the child to develop competence in measurement of liquids and solids, and in careful observation of results.

While the invention is primarily intended for use as an aid to formalized education at the pre-school (nursery or kindergarten) level or lower elementary level, it should be understood that the invention is not limited to such use. It is also well-suited for use in the home as a scientific toy, since its proper use can easily be understood by a parent who can explain it to the child.

Furthermore, although the present invention is suitable for use by young children who are unable to read, it is suited for all children, whether readers or not, as well as adults who have little or no scientific knowledge, but who can find meaningful experience by doing things with their hands. For many children at the lower elementary level with poor reading ability, the present invention can provide an educational and scientific experience with real success.

The unit as described above is the preferred embodiment for young children; however, it will be readily apparent that the unit may be modified for use by older children or adults without departing from the basic concept of the invention. Such a modified unit may be accompanied by written instruction for the student, may use chemicals which are harmful if swallowed, and may use a flat surfaced base (such as a paper of plastic sheet) with the spaces simply marked thereon for the parts of the experiment, rather than a three dimensional board with indented spaces as shown on the drawing. The flat surfaced base with the spaces merely marked maintains the necessary pedagogical structure of the experiment without the additional physical structure required for young children. Furthermore, if toxicity is not a problem, the sugar and carbon black may be replaced by other chemicals, and the water may be replaced by another liquid, for example alcohol or benzene.

Various modifications of the present invention, other than those described, will be apparent to those skilled in the art, without departing from the scope and spirit of the present invention. Consequently, it is to be understood that the present invention is not limited to the precise construction and methods described herein, these being merely illustrative of the principles and the preferred embodiments of the present invention.

What is claimed is:

1. An educational device suitable for teaching the scientific concepts of the wettability of a surface by a liquid and the suspendibility of solid particles in a liquid comprising, in combination:
    (1) a substrate having a surface substantially non-wettable by water,
    (2) a container containing water,
    (3) means for dispensing drops of water from said water container,
    (4) a container containing a soap solution,
    (5) means for dispensing drops of soap solution from said soap solution container,
    (6) a container containing finely divided, insoluble solid particles of matter,
    (7) a plurality of transparent containers suitable for receiving said solid particles and liquid,
    (8) means for transferring said finely divided solid particles from their container to said plurality of transparent containers,
    (9) a container containing a solution having no surface active properties,
    (10) means for dispensing drops of said solution having no surface active properties from said container, and
    (11) a base having a space for each of said individual component parts (1) to (10), and
    wherein each of said containers containing said solution having no surface active properties and said soap solution is respectively marked with the name of its contents or with an easily recognizable identifying symbol of its contents requiring no reading ability, said markings being located in such manner as not to be ordinarily visible to the user of the device when the containers are appropriately positioned on the base.

2. The device of claim 1 wherein (a) the base is made of plastic, (b) the finely divided, insoluble solid particles are carbon black, and (c) the solution having no surface active properties is selected from the group consisting of a salt solution and a sugar solution.

3. An educational device suitable for teaching the scientific concept of the wettability of a surface by a liquid comprising, in combination:
    (1) a substrate having a surface substantially non-wettable by water,
    (2) a container containing water,
    (3) means for dispensing drops of water from said water container,
    (4) a container containing a soap solution,
    (5) means for dispensing drops of soap solution from said soap solution container, (6) a container containing a solution having no surface active properties,
(7) means for dispensing drops of said solution having no surface active properties from said container, and
(8) a base having a space for each of said individual component parts (1) to (7), and
wherein each of said containers containing said solution having no surface active properties and said soap solution is respectively marked with the name of its contents or with an easily recognizable identifying symbol of its contents requiring no reading ability, said markings being located in such manner as not to be ordinarily visible to the user of the device when the containers are appropriately positioned on the base.

4. The device of claim 3 wherein (a) the base is made of plastic, and (b) the solution having no surface active properties is selected from the group consisting of a salt solution and a sugar solution.

5. An educational device suitable for teaching the scientific concept of the suspendibility of solid particles in a liquid comprising, in combination:
(1) a container containing water,
(2) means for dispensing drops of water from said water container,
(3) a container containing a soap solution,
(4) means for dispensing drops of soap solution from said soap solution container,
(5) a container containing finely divided, insoluble solid particles of matter,
(6) a plurality of transparent containers suitable for receiving said solid particles and liquid,
(7) means for transferring said finely divided solid particles from their container to said plurality of transparent containers,
(8) a container containing a solution having no surface active properties,
(9) means for dispensing drops of said solution having no surface active properties from said container, and
(10) a base having a space for each of said individual component parts (1) to (9), and
wherein each of said containers containing said solution having no surface active properties and said soap solution is respectively marked with the name of its contents or with an easily recognizable identifying symbol of its contents requiring no reading ability, said markings being located on such manner as not to be ordinarily visible to the user of the device when the containers are appropriately positioned on the base.

6. The device of claim 5 wherein (a) the base is made of plastic, (b) the finely divided, insoluble solid particles are carbon black, and (c) the solution having no surface active properties is selected from the group consisting of a salt solution and a sugar solution.

References Cited

UNITED STATES PATENTS 2,845,722   8/1958   Midgley _____ 35—18

OTHER REFERENCES

General Merchandise Company Catalog for Fall 1960 through Summer 1961, pp. 688, 689 only.

Welch Scientific Company Catalog Rec'd Oct. 25, 1965 entitled "Scientific Apparatus and Supplies," pp. 539, 578, 580, 581 only.

HARLAND S. SKOGQUIST, Primary Examiner